(12) United States Patent
Jones

(10) Patent No.: US 7,260,899 B2
(45) Date of Patent: Aug. 28, 2007

(54) TAPE MEASURE HAVING A HANDLE AND A REMOVABLE CHALK LINE MARKER AND METHOD THEREFOR

(76) Inventor: Johnny T. Jones, P.O. Box 1587, Sierra Vista, AZ (US) 85636

( * ) Notice: Subject to any disclaimer, the term of this patent is extended or adjusted under 35 U.S.C. 154(b) by 0 days.

(21) Appl. No.: 11/274,650

(22) Filed: Nov. 15, 2005

(65) Prior Publication Data

US 2007/0107248 A1    May 17, 2007

(51) Int. Cl.
   *G01B 3/10*    (2006.01)
(52) U.S. Cl. .............. 33/760; 33/761; 33/767; 33/769; 33/770
(58) Field of Classification Search ......... 33/756–757, 33/760–761, 767, 769, 770
   See application file for complete search history.

(56) References Cited

U.S. PATENT DOCUMENTS

| | | | | |
|---|---|---|---|---|
| 4,516,325 A | * | 5/1985 | Cohen et al. ............. | 33/760 |
| 4,580,347 A | * | 4/1986 | McKnight ............... | 33/760 |
| 4,856,726 A | * | 8/1989 | Kang .................... | 33/767 |
| D342,686 S | * | 12/1993 | Rios .................... | D10/72 |
| 5,768,797 A | * | 6/1998 | Trevino .................. | 33/761 |
| 5,806,202 A | * | 9/1998 | Blackman et al. .......... | 33/767 |
| 5,820,057 A | * | 10/1998 | Decarolis et al. .......... | 33/761 |
| 5,822,874 A | * | 10/1998 | Nemes ................... | 33/414 |
| 6,826,845 B2 | * | 12/2004 | Pritchard ................. | 33/760 |
| 6,868,620 B2 | * | 3/2005 | Sanoner .................. | 33/769 |
| 6,895,679 B2 | * | 5/2005 | Dekort ................... | 33/756 |
| 6,944,962 B2 | * | 9/2005 | Tessel et al. .............. | 33/414 |
| 2002/0129510 A1 | * | 9/2002 | Hsieh .................... | 33/761 |
| 2006/0096113 A1 | * | 5/2006 | Kang et al. ............... | 33/761 |

* cited by examiner

*Primary Examiner*—Yaritza Guadalupe-McCall
(74) *Attorney, Agent, or Firm*—Jeffrey D. Moy; Weiss & Moy, P.C.

(57) ABSTRACT

A construction tool has a tape measure. A handle is coupled to the tape measure. The handle allows a user of any size or shape hand to comfortably and easily use the tape measure.

15 Claims, 4 Drawing Sheets

TAPE MEASURE HAVING A HANDLE AND A REMOVABLE CHALK LINE MARKER AND METHOD THEREFOR

FIELD OF THE INVENTION

The present invention relates to construction tools and, more specifically, to a combination tape measure device having a chalk line marking device removably coupled thereto, the combination tool formed in an ergonomically package having a handle grip for ease of use.

BACKGROUND OF THE INVENTION

In the construction industry, many different tools are used. In general, the construction worker will carry a number of these different tools on a tool belt which is coupled to the waist of the worker. One tool a construction worker may carry is a tape measure device. Tape measure devices typically comprise a flexible tape resiliently coiled within a housing. The tape is normally printed with incremental measuring marks for measuring distances. In use, the flexible tape is uncoiled and extended from the housing and placed on a surface to be measured. Distances can then be marked with a separate marking tool, such as a pencil, directly onto the surface measured.

Present tape measure devices have several problems. First, present tape measure devices fail to take into account the hand size of the user. Most tape measure devices are rather large and bulky in size. Because of the large size of these devices, these types of tape measure devices are difficult to handle. Furthermore, because of the large and bulky nature of these types of tape measure devices, it is difficult to use the locking switch which locks and releases the flexible tape. In present tape measure devices, the locking switch is positioned in the front of the tape measure device. For a person with small hands, it is difficult to use a large tape measure device and push the locking switch positioned in the front of the tape measure device. A further problem with current tape measure devices is that it is difficult to read the markings on the tape measure when used in confined or poorly lit areas.

Another device commonly used by construction workers is a chalk line marking device. A chalk line-marking device employs a chalk line that is wound up around a spool housed within a case. During use, the chalk line is extended and held taut near the surface to be marked. Typically, this requires two workers—one to hold the end of the chalk line and one to hold the case. The line is then grasped and released by one of the workers so that it snaps back toward the surface, thereby depositing a chalk line. Alternatively, one worker may devise a way to secure one end of the line using a weight or the like. In any event, the procedure is inconvenient. A handle is attached to the spool to allow the line to be wound back into the case after use.

The problem with present chalk line marking devices is that these devices are awkward and bulky in design. Construction workers are forced to use certain awkward hand positions in order to effectively hold and use present chalk line marking devices. Furthermore, present chalk line marking devices takes up additional space on an individual's tool belt. Space on the tool belt is required not only for the chalk line marking device, but also for bottles of chalk dust to be used in the chalk line marking device.

Therefore, a need existed to provide a device to overcome the above problem. The device must be less bulky and easier to handle then current construction tools. The device must further save space on a tool belt of a user.

SUMMARY OF THE INVENTION

In accordance with one embodiment of the present invention, it is an object of the present invention to provide an improved construction tool.

It is another object of the present invention to provide an improved construction tool that overcomes the above problems.

It is still another object of the present invention to provide an improved construction tool that save space on a tool belt of a user.

It is still another object of the present invention to provide an improved tape measure device having a handle and a chalk line marking device removably coupled thereto.

It is yet another object of the present invention to provide an improved tape measure device having a chalk line marking device removably coupled thereto that is not bulky and is easy to use.

BRIEF DESCRIPTION OF THE EMBODIMENTS

In accordance with one embodiment of the present invention a construction tool is disclosed. The construction tool has a tape measure. A handle is coupled to the tape measure. The handle allows a user of any size or shape hand to comfortably and easily use the tape measure.

In accordance with another embodiment of the present invention a construction tool is disclosed. The construction tool has a tape measure device. A handle is coupled to the tape measure. A chalk line marking device is removably coupled to the tape measure device. A lighting circuit is coupled to the tape measure device and the handle for reading markings on the tape measure device.

The present invention is best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 1:
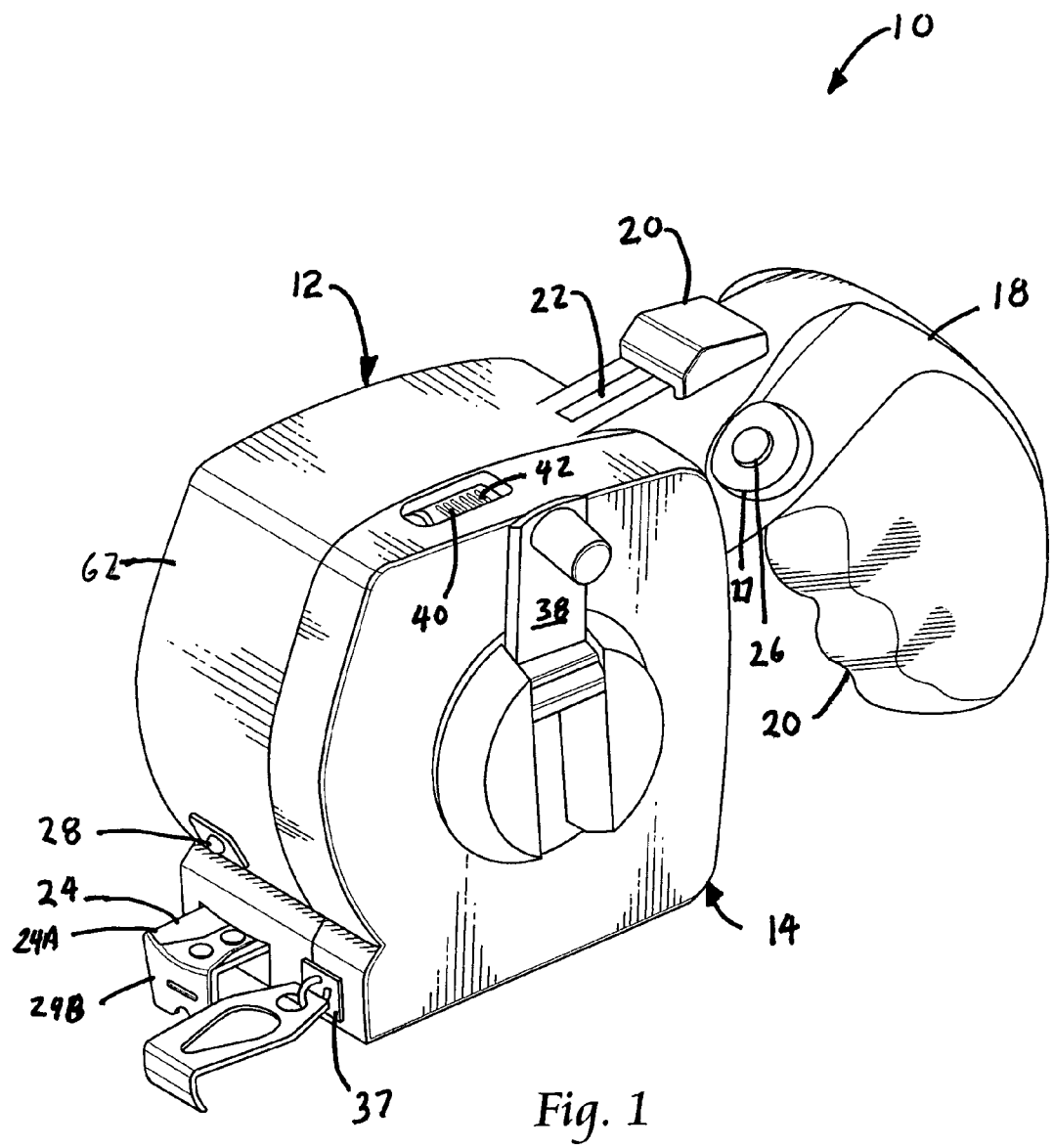
FIG. 1 is an elevated perspective view of the combination tape measure and chalk line marking device of the present invention.
Figure 2:
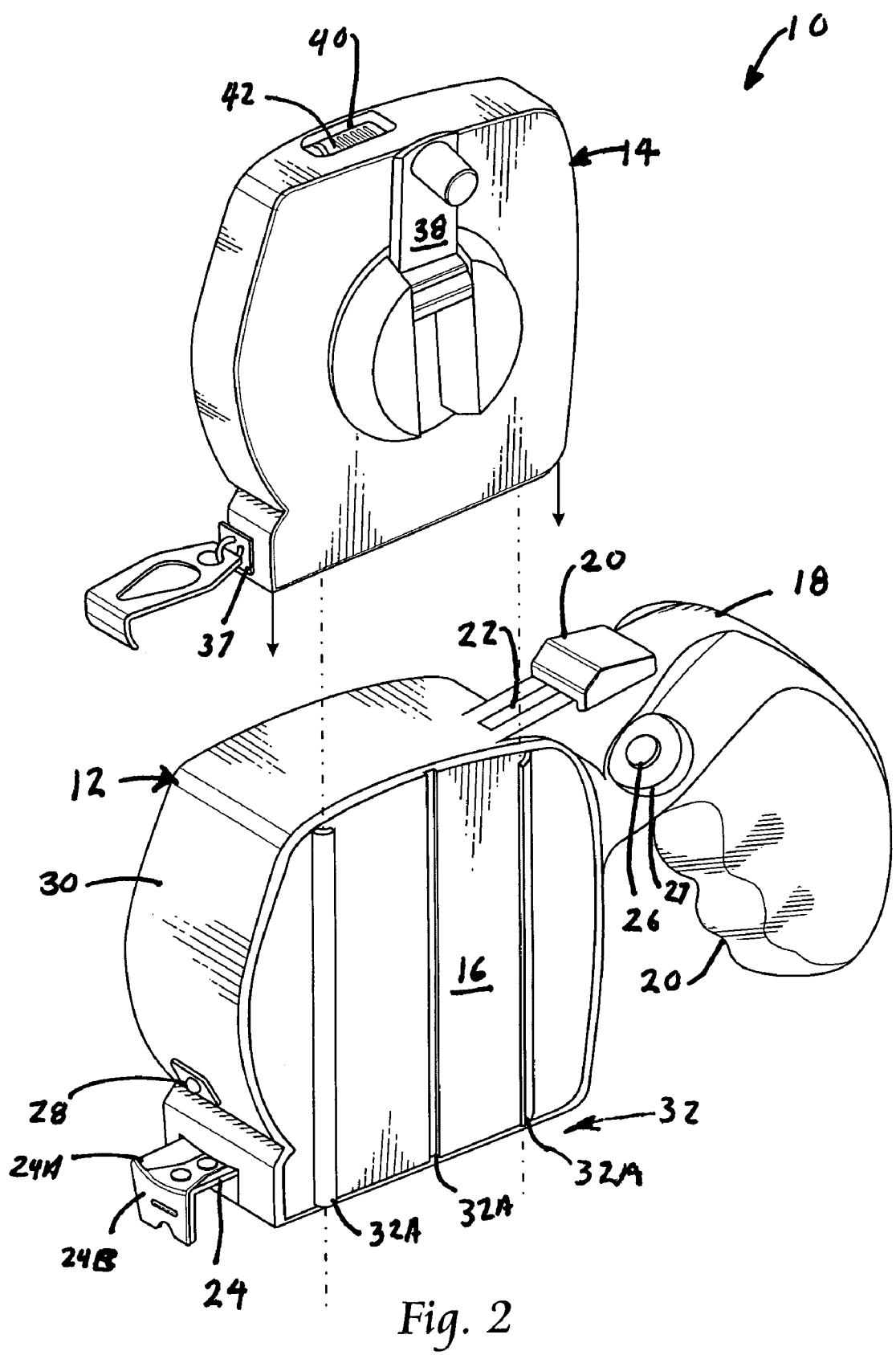
FIG. 2 is an elevated perspective view of the combination tape measure and chalk line marking device of the present invention showing the chalk line marking device removed from the tape measure.

Referring to FIGS. 1 and 2, a construction tool 10 is shown. The construction tool 10 is comprised of a tape measure device 12. A chalk line marking device 14 is removably coupled to a side surface 16 of the tape measure device 12. A handle 18 is coupled to the tape measure device 12. The handle 18 will allow one to more easily grab and use the construction tool 10. The handle 18 will have a plurality of ridges 20 formed thereon. The ridges 20 will allow one to more comfortably grab and hold the construction tool 10. The handle 18 may be covered with a soft foam or rubber like material. These types of materials will allow one to more comfortably hold the construction tool 10.

The handle 18 will have a locking switch 20 slidably coupled to a top surface thereto. The handle 18 will have a channel 22 formed on a top surface of the handle 18. The locking switch 20 is slidably coupled to the channel 22. The locking switch 20 is used to prevent the measuring tape 24 from retracting once the measuring tape 24 is extended. Since the locking switch 20 is positioned on the handle 18, the locking switch 20 is easier for a user to reach and use. In typical tape measure devices that have a locking switch, the locking switch is located on the same side as where the measuring tape extends out of the housing. Thus, it's difficult for a user to pull and lock the measuring tape in place without having to use both hands.

Figure 3:
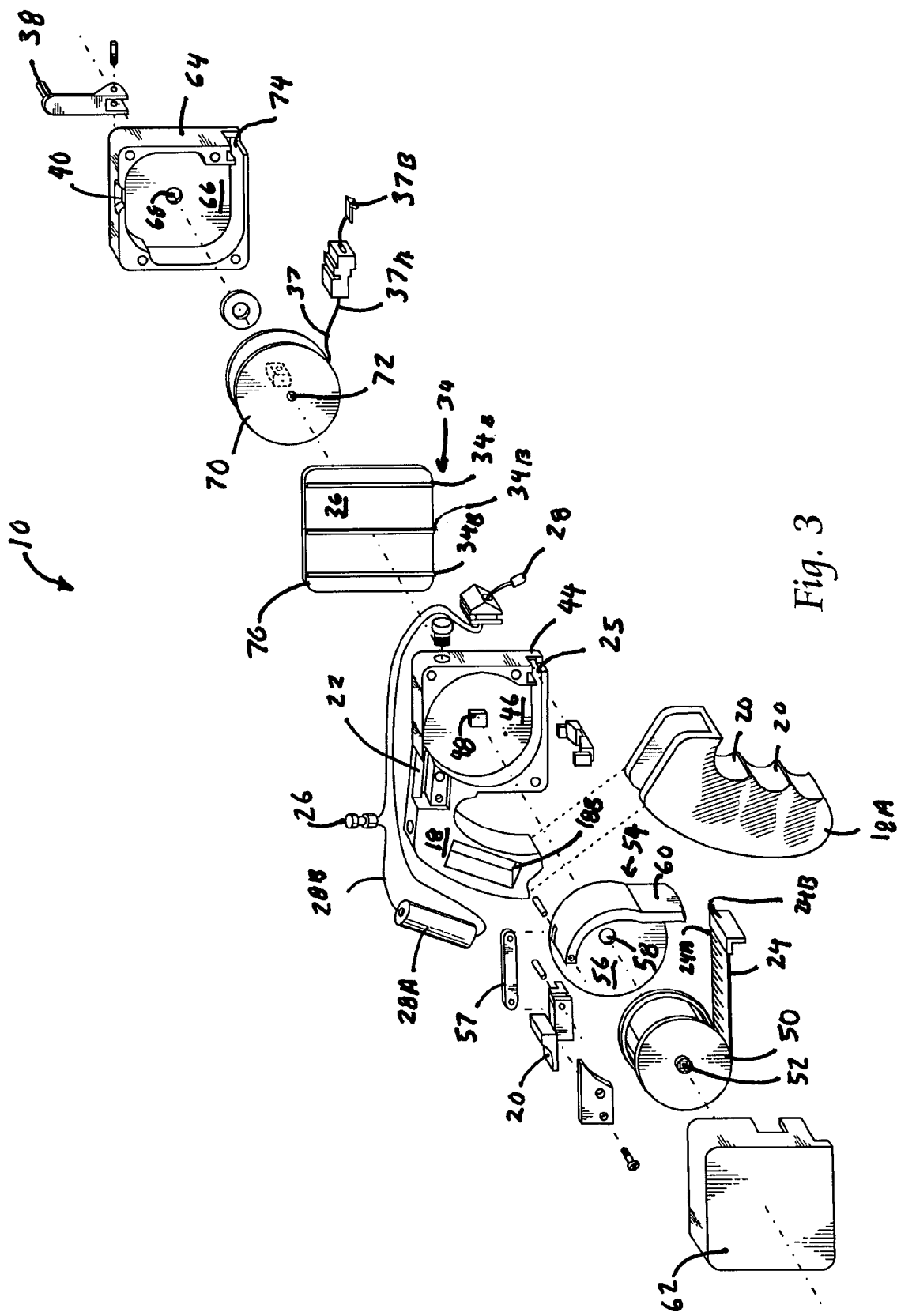
FIG. 3 is an exploded view of the combination tape measure and chalk line marking device of the present invention.

The handle 18 further has a button 26. The button 26 is positioned in a cavity 27 formed in the handle 18. The button 26 is used to activate and deactivate a light element 28. The light element 28 is located on the same side as where the measuring tape 24 extends out of the housing 44 (FIG. 3). The light element 28 is located near the measuring tape 24 to allow one to more easily read the markings on the measuring tape 24.

As seen more clearly in FIG. 2, the chalk line marking device 14 is removably coupled to a side surface 16 of the tape measure device 12. The side surface 16 of the tape measure device 12 will have connectors 32. Corresponding connectors 34 (FIG. 3) are positioned on a side 36 (FIG. 3) of the chalk line marking device 14. The connectors 32 and 34 allow one to removably couple the chalk line marking device 14 to the side surface 16 of the tape measure device 12. The connectors 32 and 34 may be male/female connectors, channels/rails, hook and loop material, etc. In accordance with one embodiment of the present invention, the connectors 32 and 34 are a pair of rails and channels. The rails 32A are formed on the side surface 16 of the tape measure device 12. The rails 32A are used to guide and hold the chalk line marking device 14 to the side surface 16 of the tape measure device 12. A corresponding pair of channels 32B are formed on the side 36 (FIG. 3) of the chalk line marking device 14. As shown in FIG. 2, the chalk line marking device 14 is moved downward so that the channels 32B of the chalk line marking device 14 engage the rails 32A of the tape measure device 12. The rails 32A will run in the channels 32B. This will hold the chalk line marking device 14 to the side surface 16 of the tape measure device 12. It should be noted that the rails 32A and channels 32B may be interchanges and formed on either surface 16 or 36.

As seen in FIGS. 1 and 2, the chalk line marking device 14 has a chalk line 37. The chalk line 37 is used to lay a line of chalk on a surface. The chalk line 37 is pulled out of the chalk line marking device 14 and across a surface. The chalk line 36 is then pulled tight so that the chalk line 37 is straight. Once straight, the chalk line 37 straight and taut, the chalk line 37 is grasped and released by the user so that it snaps back toward the surface, thereby depositing a chalk line on the surface.

The chalk line marking device 14 has a handle 38. The handle 38 is located on a side surface of the chalk line marking device 14. The handle 38 is used to retract the chalk line 37 back into the chalk line marking device 14 after the chalk line 37 is pulled out from the chalk line marking device 14.

The chalk line marking device 14 also has an opening 40. The opening 40 is formed on a top surface of the chalk line marking device 14. The opening 40 is used to allow one to pour chalk dust into the chalk line marking device 14. A cover 42 may be coupled to the opening 40 to prevent the chalk dust from coming out of the opening 40.

Figure 4:
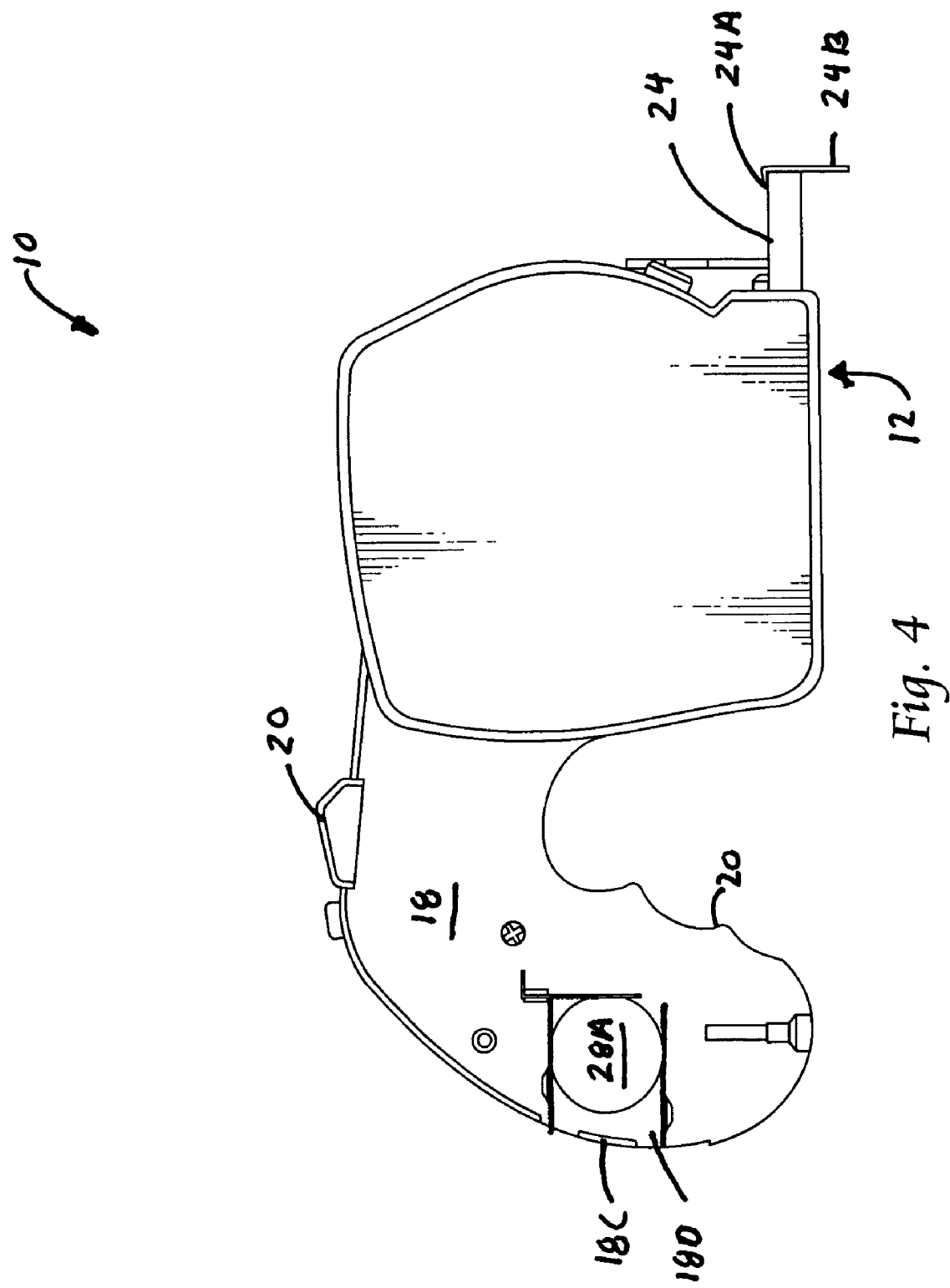
FIG. 4 is a cross-sectional view of the combination tape measure and chalk line marking device of the present invention showing a different embodiment for the power supply.

Referring now to FIGS. 3-4, the components of the tape measure device 12 and the chalk line marking device 14 will be described in more detail. The tape measuring device 12 has a housing 44. The housing 44 is generally trapezoidal in shape. The housing 44 is made out of a strong light weight material such as plastic, aluminum, or the like. A circular cavity 46 is formed in a central area of the housing 44. In the center of the circular cavity 46 is an axis 48.

A spool assembly 50 is rotationally coupled to the axis 48. The spool assembly 50 is used to house the tape measure 24. The tape measure 24 is wound around the spool assembly 50. The rotation of the spool assembly 50 will either unravel or retract the tape measure 24. The spool assembly 50 has a channeling 52 that runs through a center of thereof. The spool assembly 50 is inserted into the circular cavity 46 of the housing 44 so that the axis 48 is inserted into the channeling 52. This allows the spool assembly 50 to rotate on the axis 48 so that the tape measure 24 can be unraveled and retracted.

One end 24A of the tape measure 24 extends out of the housing 44. A slit 25 is formed in a bottom front area of the housing 44. The end 24A of the tape measure 24 extends out of the slit 25. A small lip 24B is formed on the end 24A of the tape measure 24 to prevent the end 24A of tape measure 24 from being retracted into the housing 44.

A locking mechanism 54 is coupled to the spool assembly 50. The locking mechanism 54 is used to keep the tape measure 24 in an extended position when the tape measure 24 is pulled out of the housing 44. In accordance with one embodiment of the present invention, the locking mechanism 54 has a circular plate 56. The circular plate 56 is rotational coupled to the axis 48. The circular plate 56 has an opening 58 in a central area thereof. The opening 58 allows the circular plate 56 to be inserted onto the axis 48. An arm member 60 is coupled to the circular plate 56. The arm member 60 extends downward from the circular plate 56. The arm member 60 will extend downward and press the tape measure 24 into the housing 44 thereby locking the tape measure 24 in an extended position. A locking switch 20 is coupled to the circular plate 56. A beam member 57 is hingly coupled to the locking switch 20 and the circular plate 56. By moving the locking switch 20 forward, the beam member 57 will cause the circular plate 56 to rotate downward. The arm member 60 will extend downward and press the tape measure 24 into the housing 44 thereby locking the tape measure 24 in an extended position.

A handle 18 extends off of the housing 44 of the tape measure device 12. The handle 18 will allow one to more easily grab and use the construction tool 10. The handle 18 will have a grip cover 18A. The grip cover 18A will have a plurality of ridges 20 formed thereon. The ridges 20 will allow one to more comfortably grab and hold the construction tool 10. The grip cover 18A may be covered with a soft foam or rubber like material. These types of materials will allow one to more comfortably hold the construction tool 10. In general, the handle 18 is made of a similar material as the housing 44.

The handle 18 will have the locking switch 20 slidably coupled to a top surface thereto. The handle 18 will have a channel 22 formed on a top surface. The locking switch 20 is slidably coupled to the channel 22. The locking switch 20 is used to prevent the measuring tape 24 from retracting once the measuring tape 24 is extended. Since the locking switch 20 is positioned on the handle 18, the locking switch 20 is easier for a user to reach and use. In typical tape measure devices that have a locking switch, the locking switch is located on the same side as where the measuring tape extends out of the housing 44. Thus, it's difficult for a user to pull and lock the measuring tape in place without having to use both hands.

A light 28 is coupled to the housing 44. The light 28 is generally positioned above the slit 25 formed in a bottom front area of the housing 44. The light 28 is used allows one to more easily read the markings on the measuring tape 24. The light 28 is coupled to a power supply 28A via wires 28B. The power supply 28A is generally a DC power source such as a battery or the like. The power supply 28A is generally stored in the handle 18. The handle 18 will have a cavity 18B formed therein. The cavity 18B is used to store the power supply 28A. The grip cover 18A will cover the power supply 28A thereby keeping the power supply 28A in the cavity 18B of the handle 18. Alternatively, a removable cover (not shown) may be formed on the handle 18 or grip cover 18A. One may remove the removable cover to access the power supply 28A. In accordance with another embodiment of the present invention, as shown in FIG. 4, the power supply 28A is a smaller lithium type battery. In this embodiment, a small slot 18C is formed in the handle 18. The slot 18C will have a removable frame 18D which will slide in and out of the slot 18C. The power supply 28A is placed in the frame 18D and can be slid in and out of the handle 18.

A button 26 is positioned on the handle 18. The button 26 is coupled to the power supply 28A via the wires 28B. The button 26 is used to activate and deactivate the light 28. It should be noted that the button 26 could be a switch or other type of activation means without departing from the spirit and scope of the present invention.

The tape measure device 12 further has a cover 62. The cover 62 is placed over the housing 44. The cover 62 keeps all the components of the tape measure device 12 in the housing 44.

The chalk line marking device 14 has a housing 64. The housing 64 is generally trapezoidal in shape. The housing 64 is made out of a strong light weight material such as plastic, aluminum, or the like. A cavity 66 is formed in a central area of the housing 64. In the center of the cavity 66 is an axis 68.

A spool assembly 70 is rotationally coupled to the axis 68. The spool assembly 70 is used to house the chalk line 37. The chalk line 37 is wound around the spool assembly 70. The rotation of the spool assembly 70 will either unravel or retract the chalk line 37. The spool assembly 70 has an opening 72 that runs through a center of the spool assembly 70. The spool assembly 70 is inserted into the cavity 66 of the housing 64 so that the axis 68 is inserted into the opening 72. This allows the spool assembly 50 to rotate on the axis 68 so that the chalk line 37 can be unraveled and retracted.

One end 37A of the chalk line 36 extends out of the housing 64. A small opening 74 is formed in a bottom front area of the housing 64. The end 37A of the chalk line 37 extends out of the small opening 74. A small lip 37B is formed on the end 37A of the chalk line 37 to prevent the end 37A of chalk line 37 from being retracted into the housing 64.

The chalk line marking device 14 has a handle 38. The handle 38 is rotatably coupled to the spool assembly 70. The handle 38 is also coupled on a side surface of the chalk line marking device 14. The handle 38 is used to retract the chalk line 36 back into the chalk line marking device 14 after the chalk line 36 is pulled out from the chalk line marking device 14. By rotating the handle 38, the spool assembly 70 will rotate thereby rewinding the chalk line 36 around the spool assembly 70.

The chalk line marking device 14 also has an opening 40 formed on a top surface of the chalk line marking device 14. The opening 40 is used to allow one to place chalk dust into the chalk line marking device 14. A cover 42 (FIGS. 1-2) may be coupled to the opening 40. The cover 42 would be used to prevent the chalk dust from coming out of the opening 42.

The chalk line marking device 14 further has a housing cover 76. The housing cover 76 is placed over the housing 64. The housing cover 76 keeps all the components of the chalk line marking device 14 in the housing 64.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A construction tool comprising:
    a handle having a channeling on a horizontal surface of the handle; and
    a tape measure, wherein the tape measure comprises:
        a housing having a cavity formed in a central area thereof, the handle integral to the housing and extending out from the housing;
        a spool assembly positioned in the cavity and rotatably coupled to the housing;
        a measuring tape wound around the spool assembly;
        a locking mechanism for locking and releasing the measuring tape, wherein the locking mechanism comprises:
            a circular plate positioned in the cavity and rotatably coupled to the housing; and
            an arm member coupled to the circular plate and extending in a downward direction, rotation of the circular plate moving the arm member downward and against the measuring tape;
        a locking switch slidably engaged in the channel of the handle and coupled to the circular plate for operating the locking mechanism; and
        a cover.

2. A construction tool in accordance with claim 1 further comprising a lighting circuit for reading markings on the tape measure.

3. A construction tool in accordance with claim 2 wherein the lighting circuit comprises:
    a lighting element coupled to the tape measure;
    a button integral to the handle for activating and deactivating the lighting element; and
    a power supply coupled to the button and the lighting element.

4. A construction tool in accordance with claim 1 further comprising a chalk line marking device removably coupled to the tape measure.

5. A construction tool in accordance with claim 4 wherein the chalk line marking device comprises:
    a chalk line housing having a cavity formed in a central area thereof;
    a chalk line spool assembly positioned in the cavity and rotatably coupled to the chalk line housing;

a chalk line wound around the chalk line spool assembly; and a chalk line handle rotatably coupled to the housing and the chalk line spool assembly.

6. A construction tool in accordance with claim 4 wherein the chalk line marking device further comprises an opening formed on a top surface of the chalk line housing, the opening allowing chalk power to be placed in the housing.

7. A construction tool in accordance with claim 4 wherein the chalk line marking device further comprises a cover coupled to the chalk line housing.

8. A construction tool in accordance with claim 1 wherein the handle has a plurality of ridges.

9. A construction tool in accordance with claim 1 wherein the handle has a grip cover coupled to the handle.

10. A construction tool in accordance with claim 9 wherein the grip cover coupled to the handle has a plurality of ridges.

11. A construction tool comprising:
a handle having a channel;
a tape measure, wherein the tape measure comprises:
   a housing having a cavity formed in a central area thereof, the handle integral to the housing and extending out from the handle;
   a spool assembly positioned in the cavity and rotatably coupled to the housing;
   a measuring tape wound around the spool assembly;
   a locking mechanism for locking and releasing the measuring tape, wherein the locking mechanism comprises:
      a circular plate positioned in the cavity and rotatably coupled to the housing; and
      an arm member coupled to the circular plate and extending in a downward direction, rotation of the circular plate moving the arm member downward and against the measuring tape;
   a locking switch slidably engaged in the channel of the handle for operating the locking mechanism; and
   a cover
a chalk line marking device removably coupled to the tape measure device; and a lighting circuit coupled to the tape measure device and the handle for reading markings on the tape measure device.

12. A construction tool in accordance with claim 11 wherein the lighting circuit comprises:
a lighting element coupled to the tape measure device;
a button coupled to the handle for activating and deactivating the lighting element; and
a power supply housed in the handle and coupled to the button and the lighting element.

13. A construction tool in accordance with claim 11 wherein the chalk line marking device comprises:
a chalk line housing having a cavity formed in a central area thereof;
a chalk line spool assembly positioned in the cavity of the chalk line housing and rotatably coupled to the chalk line housing;
a chalk line wound around the chalk line spool assembly;
a chalk line handle rotatably coupled to the housing and the chalk line spool assembly; and
a chalk line housing cover coupled to the chalk line housing.

14. A construction tool in accordance with claim 13 wherein the chalk line marking device further comprises an opening formed on a top surface of the chalk line housing, the opening allowing chalk power to be placed in the housing.

15. A construction tool comprising:
a handle having a channeling; and
a tape measure device, the handle integral to the tape measure device and extending out from the tape measure device;
a locking mechanism housed in the tape measure device and including a circular plate rotatably coupled to said tape measure device for locking and releasing a measuring tape in the tape measure device; and
a locking switch slidably engaged in the channel of the handle and coupled to said circular plate for operating the locking mechanism.

* * * * *